United States Patent [19]

Floreancig et al.

[11] Patent Number: 5,219,540
[45] Date of Patent: Jun. 15, 1993

[54] METHOD OF REMOVING RUTHENIUM CONTAINED IN URANIUM-CONTAINING SOLUTIONS

[75] Inventors: Antoine Floreancig, La Murette; Francois Nicolas, Orange, both of France

[73] Assignee: Comurhex Societe pour la Conversion de l'Uranium en Metal et Hexafluoroure, Courbevoie, France

[21] Appl. No.: 829,266

[22] Filed: Feb. 3, 1992

[51] Int. Cl.$^5$ .................. C01G 55/00; C22B 3/42; C22B 60/02
[52] U.S. Cl. ........................... 423/7; 423/22; 252/627
[58] Field of Search ............ 423/7, 22; 75/398; 252/627

[56] References Cited

U.S. PATENT DOCUMENTS

| | | | |
|---|---|---|---|
| 2,894,816 | 7/1959 | Hyman et al. | 423/22 |
| 3,708,508 | 1/1973 | Schulz | 252/364 |
| 3,922,231 | 11/1975 | Carlin | 252/631 |
| 4,025,602 | 5/1977 | Campbell et al. | 423/7 |
| 4,105,442 | 7/1978 | Fieberg et al. | 75/720 |
| 4,111,856 | 9/1978 | Haag et al. | 521/30 |
| 4,116,863 | 9/1978 | Berton et al. | 252/631 |
| 4,282,112 | 8/1981 | Fitoussi et al. | 252/626 |
| 4,526,658 | 7/1985 | Kubata et al. | 203/13 |
| 4,622,176 | 11/1986 | Motoki et al. | 252/631 |
| 4,938,895 | 7/1990 | Motojima | 252/627 |
| 5,114,473 | 5/1992 | Abatjoglou et al. | 75/722 |

FOREIGN PATENT DOCUMENTS 2355919  1/1978  France .

OTHER PUBLICATIONS

Chemical Abstract, 105038d, vol. 73, No. 20, Nov. 16, 1970 Mishima et al, p. 456.
Chemical Abstract, 106863e, vol. 79, No. 18, Nov. 5, 1973 Chizh, p. 104.

Primary Examiner—Donald P. Walsh
Assistant Examiner—Ngoclan T. Mai
Attorney, Agent, or Firm—Dennison, Meserole, Pollack & Scheiner

[57] ABSTRACT

A method for removing ruthenium from a uranium-containing solution comprising adding a nitrite to the solution and passing the solution over a quaternary ammonium or tertiary amine resin to selectively fix the ruthenium.

8 Claims, No Drawings

METHOD OF REMOVING RUTHENIUM CONTAINED IN URANIUM-CONTAINING SOLUTIONS

BACKGROUND OF THE INVENTION

The invention concerns a method of removing ruthenium (Ru) contained in uranium solutions, particularly those which emanate from factories for reprocessing spent nuclear fuels and which still contain traces of ruthenium.

DESCRIPTION OF RELATED ART

Uranium-containing solutions obtained after spent nuclear fuels based on uranium have been reprocessed are generally free of the plutonium and other fission products which appeared while the fuel was in the reactor. However, there are still a few traces of Ru 106, of the order of a few parts per billion. At this concentration they are very difficult to eliminate and analyse chemically, but they give the uranium solution containing them a harmful radioactivity, which is present in the various fluxes and particularly the effluents. Use of the uranium solutions thus polluted also creates safety problems: protection of personnel and pollution of installations where the uranium solutions are recycled and reconverted. It is thus extremely important to be able to eliminate these traces of Ru 106 completely from the uranium solutions, otherwise the solutions would have to be stored to allow the radioactivity to decay naturally to an acceptable level.

Known methods of separating the Ru generally consist of carrying out liquid-liquid extraction with the aid of various solvents which are not commonly used or which contain special additives; these methods may be preceded by chemical treatments of the Ru. Processes in which the Ru is precipitated in the form of compounds, or reduced and deposited electrochemically in metallic form are also known.

These methods are generally adapted to carry out reprocessing proper of uranium-containing solutions, i.e. solutions containing large quantities of Ru, and the results obtained are uncertain when only traces of Ru have to be removed. In the liquid-liquid extraction methods moreover, the Ru is generally extracted in dilute, liquid form, which may create problems of storage and subsequent disposal when the radioactivity has decayed.

SUMMARY OF THE INVENTION

In view of these disadvantages Applicants have developed a method of purging uranium-containing solutions of ruthenium, which is characterised in that nitrites are added to the solution and the ruthenium is fixed by passing it over a quaternary ammonium or tertiary amine resin.

A method of this type is particularly well adapted to uranyl nitrate solutions dilute or concentrated.

DETAILED DESCRIPTION OF THE INVENTION

The solutions to be treated according to the invention, may contain from 50 to 600 g of uranium per liter (gU/l), but contain from 150 to 400 gU/l.

The Ru content of the uranium solutions to be treated may be very high, ranging from a few ppb to several g/l. However the method of the invention is chiefly important for enabling all the Ru to be removed from the solutions, including cases where the initial solutions contain only a few traces of Ru, corresponding e.g. to an Ru 106 activity of 2 to 50$\mu$ Ci per kg of uranium or even 2 to 25$\mu$ Ci/kgU.

The acidity of the solutions treated is from about 0.01N to 0.5N. The temperature is normally below 40° C. or preferably from 0° to 30° C. in order to keep the nitrites stable and also protect the resin.

The nitrite may be added by adding an alkali metal nitrite or preferably ammonium nitrite, or by bubbling $NO_2$ directly into the uranium solution; the concentration used is from 0.1 to 50 g/l expressed as $NO_2$.

Without this addition of nitrite the ruthenium is not fixed selectively on the resins, and the action of the nitrites is more effective, the later they are added to the uranium solution; the best procedure is to place them in the bed of resin simultaneously with the introduction of the uranium solution.

As already mentioned, the resins are of the quaternary ammonium or tertiary amine type. It is preferable to use the following resins, produced by ROHM & HAAS:

| | |
|---|---|
| Amberlite IRA 420 (or IRA 900) | Strongly anionic, type I gel (quaternary ammonium) |
| Amberlite IRA 93 SP | Moderately anionic, macroporous (tertiary amine) |

These resins can fix a nitrosyl-ruthenium complex obtained by adding nitrite. Hence it is important for the solution providing the resin to be in the best possible condition, to enable the complex to form. Thus the addition of the nitrite and the fixation of Ru are carried out between 10° and 50° C. and preferably below 25° C. The method of the invention enables uranium-containing solutions to be obtained completely free of Ru. The first time Ru is found to escape is when the volume of uranium solution passed over the resin is 20 to 25 times the volume of the bed of resin expressed as bed volume (BV), or 20 to 25 BV. It is particularly important to use the fixing agent under the form of a resin in order to obtain a such result. Saturation of the resin may of course be increased by tolerating leakage of Ru into the effluent uranium-containing solution, within selected limits.

When the resin is saturated with Ru it may be washed, simply by washing with water, to recover all the uranium impregnating the resin without eluting the fixed Ru.

The resin can then easily be stored in a controlled tip.

But the purging process may advantageously be continued so that the resin can be recovered to carry out successive Ru fixing and eluting cycles, with the Ru finally being obtained in a concentrated, solid form in which it can easily be stored.

This complementary part of the process, which follows the above-mentioned washing with water, comprises eluting the ruthenium-saturated resin with a strong acid. The ruthenium-containing solution obtained may then be neutralised, with the Ru remaining in solution, after which the Ru may be fixed again by passing the neutralised solution over a thiol-type resin containing at least one RSH group.

The advantage of fixing the ruthenium again is that the quantity of Ru, per unit volume of resin, fixed in the neutralised medium by these thiol-type resins is at least 5 to 10 times greater than that fixed by the tertiary amine or quaternary ammonium resins used in the previously described phase of the method of the invention. The higher the concentration of Ru in the neutralised eluting solution supplied to the resin, the more Ru will be fixed. The coefficients of partition (ratio of the concentration of Ru in the resin to that in the solution, at equilibrium) may be over 700.

Thus when the Ru has been fixed, the resin charged with it may be dealt with so that it can be stored in a controlled tip in solid, concentrated form. Conditioning treatment could possibly be carried out first, with a view to other subsequent destinations.

An effluent salt solution free from Ru is also obtained when the Ru has been fixed. This may be re-used, concentrated and/or easily discharged.

A special embodiment of the complementary part of the method comprises using nitric acid as the strong eluting acid, preferably in concentrated solution, to re-extract Ru in the most concentrated solution possible. The acid solution obtained is then neutralised e.g. with ammonia or a strong alkali metal base such as caustic potash or soda, to give an ammonium nitrate, potassium or sodium solution with the ruthenium dissolved in it.

Of the thiol-type resins, the IMAC GT 73-type resin produced by DUOLITE has proved to be particularly appropriate. The neutralised solution containing Ru, obtained in the first phase of the process, with a PH normally above 5 or preferably from 8 to 10 and with a nitrate content of about 300 g/l, is percolated through it at a speed generally no higher than 4 BV/h, so as to saturate the resin well and avoid premature leakages of Ru in the effluent. It is preferable to operate at room temperature and particularly below 50° C. in order to protect the resin.

EXAMPLE 1

An initial uranyl nitrate solution of the following composition is used to illustrate the method of the invention:

| | |
|---|---|
| U content: | 380 g/l |
| $H^+$ content: | 0.106N |
| Ru content: | 1 mg/l (i.e. 7.4 ppb/U or 925 000 Bq/kgU or 25μ Ci/kgU) |

A resin column with BV=25 cm3 is used.

The resin used is IRA 93 SP. The uranium-containing solution and a 25 g/l solution of ammonium nitrate are fed into the column simultaneously, so that the nitrite content (expressed as $NO_2$) of the uranium solution passing over the resin is 5 g/l.

The flow rate of the uranium-containing solution is 2 BV/h. Under these conditions, Ru leakage is zero until 20 BV of the uranium-containing solution has passed through; from 25 BV the resin is saturated and no longer fixes any Ru.

The saturated resin is then washed with water at 40° C. before the ruthenium is eluted with 5 BV of a 2N solution of nitric acid.

A series of fixing-washing-eluting cycles is carried out and the effluent solutions obtained, containing Ru, are put together.

The resultant solution is neutralised to pH 9 with a concentrated solution of $NH_4OH$. The (190 g/l) solution of $NH_4NO_3$ obtained, containing Ru in solution (5 mg/l or 9430 Bq/l), is passed into a column 60 cm high and 1.3 cm in diameter, containing 65 cm3 (BV=65 cm3) of IMAC GT 73 resin, at a flow rate of 4.5 BV.

Under these conditions Ru leakage appears when 600 BV of the saline solution has passed through.

EXAMPLE 2

A saline solution similar to the previous one, but containing only the equivalent of 2100 Bq/l of Ru and obtained by neutralising the acid effluent to pH 9 with $NH_3$, is passed over the same resin at a speed of 3.0 BV/h. Ru is found to leak after the passage of 1400 BV.

What is claimed is:

1. A method of removing ruthenium from a uranyl nitrate-containing solution, comprising adding a nitrite to the solution and passing the nitrite-containing solution over a quaternary ammonium or tertiary amine resin, fixing the ruthenium thereto, and leaving a uranium solution completely free of ruthenium.

2. The method of claim 1, wherein the solution contains from 0.1 to 50 g/l nitrite (expressed as $NO_2$).

3. The method of claim 1 or 2, additionally comprising eluting the ruthenium fixed on the resin with a strong acid.

4. The method of claim 3, wherein the strong acid is nitric acid.

5. A method for removing and recovering ruthenium from a uranium-containing solution, comprising the steps of:
   a) adding a nitrite to the uranium-containing solution;
   b) passing the nitrite-containing solution over a quaternary ammonium or tertiary amine resin, fixing the ruthenium thereto;
   c) eluting the ruthenium fixed to the resin with a strong acid eluting solution;
   d) neutralizing the eluting solution to obtain a salt solution containing dissolved ruthenium;
   e) fixing the ruthenium by passing the salt solution over a thiol-type resin with an RSH group.

6. The method of claim 5, wherein the thiol resin is Duolite's IMAC GT 73 (registered trade mark).

7. The method of claim 5, wherein said eluting solution is neutralized to a pH over 5 with ammonia or a concentrated solution of a strong alkaline base.

8. The method of claim 7, wherein the neutralised solution is a solution of ammonium, potassium or sodium nitrate with the ruthenium dissolved in it.

* * * * *